United States Patent [19]

Uhlig et al.

[11] Patent Number: 4,462,729

[45] Date of Patent: Jul. 31, 1984

[54] EXPANSION DOWEL FOR A STRUCTURAL COMPONENT HAVING A HOLLOW SPACE

[75] Inventors: Raimer Uhlig; Gusztav Lang, both of Munich, Fed. Rep. of Germany

[73] Assignee: Hilti Aktiengesellschaft, Schaan, Liechtenstein

[21] Appl. No.: 326,589

[22] Filed: Dec. 2, 1981

[30] Foreign Application Priority Data

Dec. 9, 1980 [DE] Fed. Rep. of Germany ....... 3046290

[51] Int. Cl.$^3$ .............................................. F16B 13/04
[52] U.S. Cl. ........................................ 411/15; 411/344
[58] Field of Search ............... 411/15, 32, 33, 44, 411/45, 46, 515, 25, 340, 341, 342, 343, 344, 345, 346

[56] References Cited

U.S. PATENT DOCUMENTS

| | | | |
|---|---|---|---|
| 2,024,871 | 12/1935 | Parsons | 411/342 |
| 3,241,420 | 3/1966 | Passer | 411/346 |
| 3,285,118 | 11/1966 | Elkins | 411/346 |
| 3,487,744 | 1/1970 | Montana | 411/346 |
| 4,022,100 | 5/1977 | Johnson | 411/57 |
| 4,181,061 | 1/1980 | McSherry | 411/55 |
| 4,289,062 | 9/1981 | Schiefer | 411/15 X |
| 4,392,763 | 7/1983 | Brown | 411/342 |

*Primary Examiner*—Thomas J. Holko
*Assistant Examiner*—Adrian Whitcomb
*Attorney, Agent, or Firm*—Toren, McGeady and Stanger

[57] ABSTRACT

Expansion dowels for use in slabs, masonry and similar structural components having a face surface and a hollow space inwardly of the face surface so that the dowel can be inserted through the face surface into the hollow space. The dowel has a shaft part which extends through the face surface into the hollow space. Expansion arms are flexibly articulated to the shaft part and are located in the hollow space when the dowel is inserted. Support levers are flexibly articulated to the expansion arms and are interconnected by a link. The support levers are also located within the hollow space when the dowel is fully inserted. The expansion arms and support levers can be angularly displaced between an insert position so that the dowel can be inserted into the hollow space and an expansion position for holding the dowel in the inserted position. Releasable stops are provided for securing the expansion arms and support levers in the insert position.

2 Claims, 8 Drawing Figures

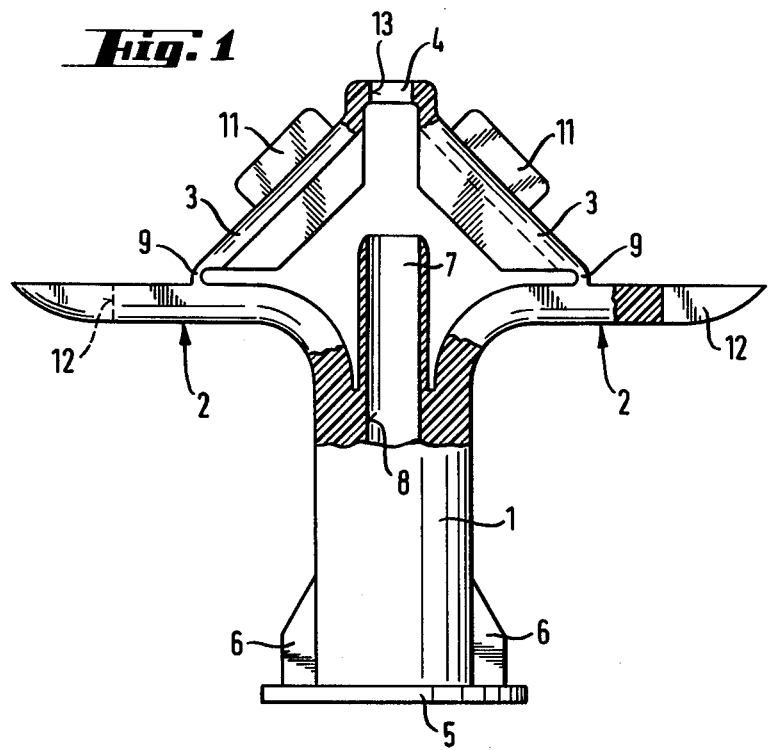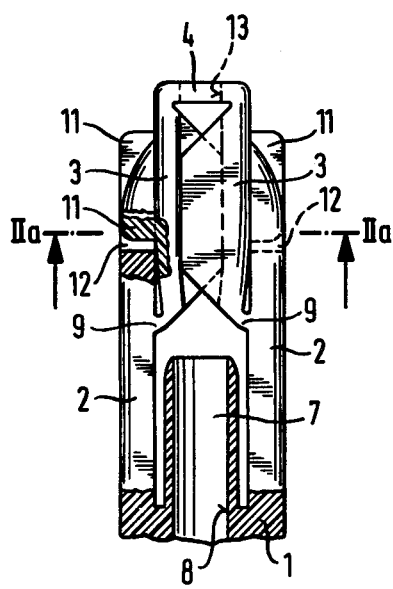

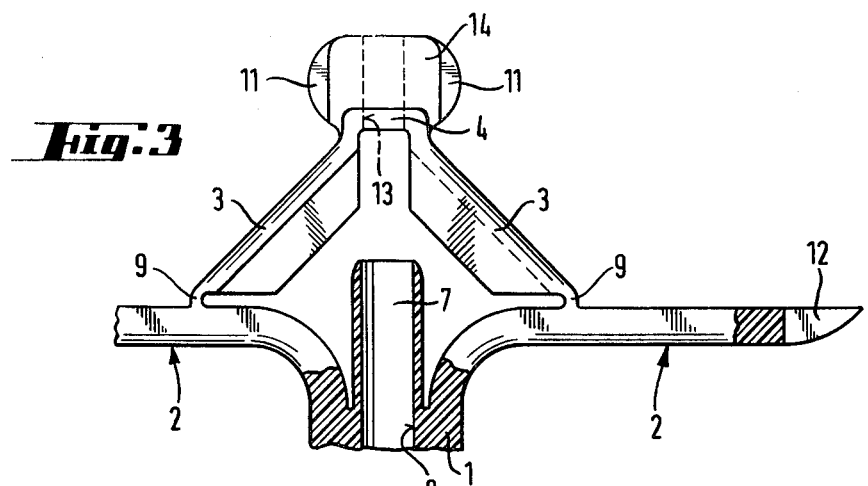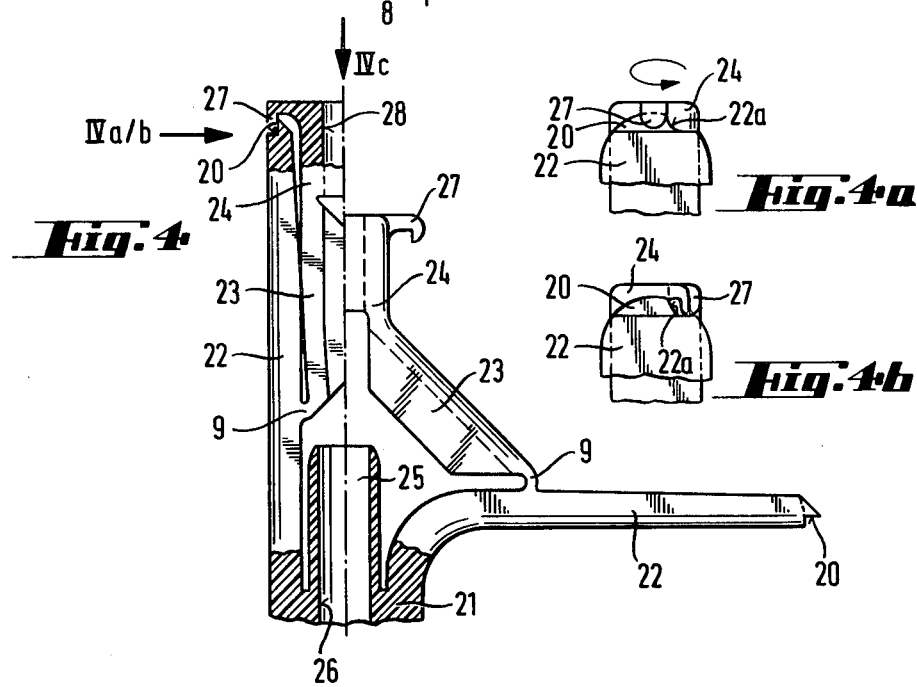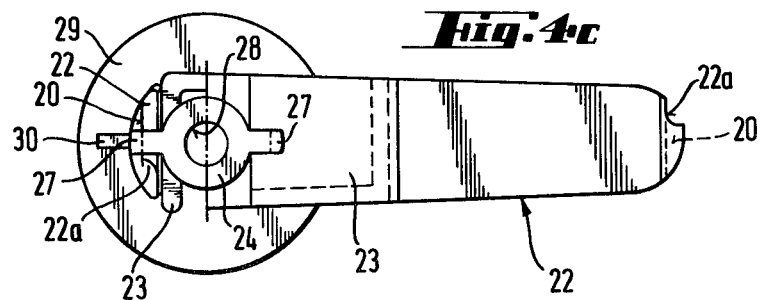

EXPANSION DOWEL FOR A STRUCTURAL COMPONENT HAVING A HOLLOW SPACE

SUMMARY OF THE INVENTION

The present invention is directed to an expansion dowel for use in slabs, masonry and similar structural components having a face surface and a hollow space inwardly of the face surface. The expansion dowel includes a shaft part with expansion arms flexibly connected to the shaft part and support levers flexibly articulated to the expansion arms, and a link interconnecting the support levers.

There are known expansion dowels made of a synthetic plastics material with expansion arms which project radially outwardly from a hollow shaft part with the arms disposed approximately perpendicularly to the axis of the shaft part in the expanded position. A supporting lever is attached to each of the expansion arms by a flexible connection. The opposite ends of the supporting levers from the connections to the expansion arms are interconnected by a link. The supporting levers and the link can be directed toward or away from the expansion arms depending on the embodiment of the dowel used.

Such expansion dowels must be inserted through a previously formed aperture if they are to be anchored in a structural component. To afford insertion through the aperture, the expansion arms which project outwardly from the shaft part in the expanded position can be folded along with the support levers into an insert position where they form an extension of the shaft part and extend approximately parallel with its axis.

The expansion arms are folded manually into the insert position against the resilient force of the dowel assembly which acts to displace the various parts into the expanded position. Accordingly, the expansion dowel tends to return from the folded insert position back to the expanded position. Where structural components have several hollow spaces disposed one behind the other, such as in brick masonry, and where the opening through the component is quite uneven, or where a soft insulating material is embedded on the front of the component, it has been known to happen that when the expansion dowel is inserted the expansion arms open outwardly in a premature and spontaneous manner. When this happens, the dowel cannot be inserted for the desired full depth into the component, that is, it cannot be inserted fully into the hollow space within the component.

Therefore, the primary object of the present invention is to provide an expansion dowel of the type described which assures full insertion into a receiving opening while avoiding premature movement into the expanded position.

In accordance with the present invention, stops or locking members are provided for releasably holding the expansion arms and support levers in the insert position.

In operation, the stops or locking members provide a snap-action or form-locking engagement of the expansion arms and support levers in the insert position. This locking action assures that the expansion dowel remains in the folded insert position for placement into the intended opening or aperture. The locking action must be such that it exceeds the resilient character of the dowel which tends to cause spontaneous opening of the expansion arms and support levers into the expanded position.

After the expansion dowel is inserted through an opening or aperture with the expansion arms and support levers located inwardly of the surface through which the dowel is inserted or within a hollow space within the component, a link interconnecting the support levers is displaced in the axial direction of the dowel shaft either in the direction of insertion or in the opposite direction. The displacement of the link is effected by a screw or bolt extending through a bore in the shaft part into threaded engagement with the link. With the displacement of the link, the stops or locking members are released. With the locking action released, the expansion arms open up completely, extending outwardly from the folded position along the axis of the shaft and providing the anchoring of the dowel within the component.

In one embodiment, stops are provided along a midportion of the elongated part of the support levers in the form of projections or ribs. This embodiment is particularly suitable for expansion dowels with relatively short expansion arms, however, for expansion dowels with relatively long expansion arms it is advantageous to locate the stop or locking members on the link. Long expansion arms are appropriate in low strength structural components, for example, gypsum walls or masonry constructed gas-formed concrete, because of the low strength of such structures for a given unit of area. Accordingly, in one arrangement the link, constructed as a bridge, has a box molded onto it with the locking members projecting radially from the box in the form of projections, ribs or the like. The locking action is provided when the projections, ribs or similar locking members disposed on the support levers or on the link engage within slot-shaped openings in the expansion arms. Advantageously, the openings in the expansion arms are located at the ends remote from the flexible connection to the shaft part. Preferably, the openings in the expansion arms are located at the free end of the arms. Further, the openings extend to and are open at the free ends of the expansion arms to afford a snap connection by engagement with the projections or ribs for securing the expansion arms and support levers against the spring action tending to displace them into the expanded position.

In another embodiment, the locking members are provided as hook-like elements which partially engage over the expansion arms. These hook-like elements can be disposed on the support levers as well as on the link to lock and secure the expansion arms in the folded insert position of the dowel.

An especially secure locking action is achieved when the hook-like elements, shaped as fingers, are disposed on the link facing in the opposite direction to the insert direction so that they releasably engage the ends of the expansion arms remote from the shaft part of the dowel. After the expansion dowel in the insert position is fully inserted into the intended opening, the locking action is released by turning a screw-shaped member, engaged with the link, so that the link is angularly displaced relative to the expansion arms. In this way, the hook-like elements are released and the expansion arms unfold outwardly into the expanded position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention .

BRIEF DESCRIPTION OF THE DRAWING

In the drawing:

FIG. 1 is an elevational view, partly in section, of an expansion dowel embodying the present invention and illustrated in the expanded position;

FIG. 2 is a partial elevational view, partly in section, of the expansion dowel shown in FIG. 1, with the dowel parts folded into the insert position;

FIG. 2a is a sectional view through the expansion dowel taken along the line IIa—IIa in FIG. 2;

FIG. 3 is a partial elevational view, partly in section, of another embodiment of an expansion dowel incorporating the present invention, with the dowel shown in the expanded position;

FIG. 4 is a partial elevational view of yet another embodiment of an expansion dowel embodying the present invention with one-half of the dowel shown in the insert position and the other half in the expanded position;

FIG. 4a is a detail view of a part of the expansion dowel shown in FIG. 4 viewed in the direction of the arrow IVa with the dowel parts shown in the locked position;

FIG. 4b is a detail view similar to FIG. 4a, however, with the locking action on the dowel parts being released; and FIG. 4c is a plan view of the expansion dowel displayed in FIG. 4.

DETAIL DESCRIPTION OF THE INVENTION

In FIG. 1 an expansion dowel is shown including an axially extending shaft part 1, a pair of expansion arms 2 each flexibly connected to the shaft part with the arms being located on opposite sides of the shaft part. Further, support levers 3 are flexibly articulated to the expansion arms intermediate their ends and a bridge-shaped link 4 interconnects the ends of the support levers remote from the connection to the expansion arms. In FIG. 1 the expansion dowel is shown in the expanded position with the expansion arms 2 extending radially outwardly and perpendicularly of the axis of the shaft part 1. In principle, it is possible to provide a number of expansion arms 2 and support levers 3 greater than two.

As viewed in FIG. 1, the shaft part has a lower or trailing end on which a flange 5 is located. The flange 5 projects outwardly from the shaft body and serves as a limiting member or stop when the expansion dowel in the insert position is pressed into a receiving opening or aperture in a structural component. Ribs 6 are connected to and extend axially from the flange along the body part and serve to prevent rotation of the dowel when it is inserted into a receiving opening. the ribs tend to dig into or grip the surface of the opening in the structural component preventing rotation. At the leading end of the shaft part 1, that is the end which is inserted into the receiving opening, there is a guide sleeve 7 molded with the shaft part 1 and providing part of a bore through which a screw or bolt member can be placed. The threaded member can be in the form of a screw or a bolt so that it extends through a central bore 8 located in the shaft part 1 and continuing through the guide sleeve 7. Support levers 3 are integrally connected to the expansion arms 2 in an articulated manner via connecting sections 9. As can be seen in FIG. 1, these connecting sections 9 have a reduced size as compared to the remainder of the support levers to assure adequate articulation between the expansion arm and the support levers. Ribs 11 are formed on and project outwardly from the surfaces of the support levers 3 facing away from the axis of the shaft part 1. These ribs 11 each engage within a slot-shaped opening 12 in the free end of the corresponding expansion arm. This interengagement is shown in FIGS. 2 and 2a locking the expansion arms and support levers in the insert position. To effect the locking action the expansion arms are swung or folded inwardly from the position shown in FIG. 1 in a manual operation so that the various parts of the dowel are locked in the insert position shown in FIG. 2. The folding of the expansion arms takes place counter to the resilient characteristic of the dowel which tends to displace the expansion arms into the expanded position.

By folding the expansion arms inwardly, the dowel is placed in the insert position as shown in FIG. 2 with the expansion arms 2 and the support levers 3 moving relative to one another around the connection sections 9 with the free ends of the arms moving inwardly toward the link 4. As the expansion arms 2 approach the axis of the dowel or the shaft part 1, the ribs 11 facing outwardly from the support levers 3 enter into the slot-shaped openings 12 and provide a locking action securing the dowel in the insert position. The force provided by this locking action is greater than the resilient characteristic of the dowel parts tending to displace the expansion arms 2 outwardly into the expanded position.

The locking action with the ribs 11 secured into the openings 12 can be appreciated in FIG. 2a. The ribs 11 and the openings 12 are dimensioned so that the locking action takes place when the ribs are forced through the openings as the expansion arms are folded inwardly along the axis of the shaft part 1. The inherent spring action of the material forming the openings 12 provides the required locking action. To achieve an adequate flexural stiffness of the support levers 3, the levers are formed with L-shaped cross-section, note FIG. 2a. A central opening 13 is provided in the link 4 so that the threaded member inserted through the bore 8 can engage the link 4.

After the expansion dowel, in the insert position, has been placed for a sufficient depth into a receiving opening or borehole in the structural component, the threaded member is turned so that it draws the link 4 backwardly toward the shaft part 1 overcoming the locking action and withdrawing the ribs 11 out of the slots 12 and releasing the expansion arms 2 so that they unfold outwardly into the position shown in FIG. 1 due to the resiliient characteristic of the dowel. In the position shown in FIG. 1 the expansion arms engage an inside surface within the structural component for providing a desired locking action when the dowel is used.

Another embodiment is displayed in FIG. 3 and for the most part corresponds to the embodiment shown in FIGS. 1, 2 and 2a. Accordingly, similar parts have the same reference numerals. The difference between these two embodiments is that the ribs 11 are located on a box 14 secured to and extending outwardly from the link 4. In the folded or insert position, the ribs 11 engage within the slot-shaped openings 12 in the free ends of the expansion arms 2. This arrangement is especially advantageous when long expansion arms are required, as in the case when the dowels are to be secured within soft structural elements. The releasing action takes place in the same way as described above, the link 4 is drawn toward the shaft part 1 by a threaded member causing the ribs 11 to be released from the slots 12 so that the resilient action of the support levers displaces the expansion arms outwardly into the expanded position, as shown.

In FIG. 4 yet another embodiment of the invention is exhibited with the right-hand half of the dowel shown in the expanded position and the left-hand half shown in the insert position. As in the previous embodiments, expansion arms 22 are molded as a part of the shaft part so that they are flexibly connected to it. Similarly, the support levers 23 are each integrally and flexibly articulated to a corresponding one of the expansion arms 22. A link 24 interconnects the ends of the support levers 23 which are spaced from the expansion arms in the expanded position. A guide sleeve 25 is formed as a part of and extends axially from the shaft part 21 with a central bore 26 extending through the shaft part and the sleeve. The central bore 26 is arranged to receive a threaded member, not shown, such as a screw or bolt. The leading end of the dowel formed by a surface on the link 24 has a pair of oppositely outwardly directed hook-like elements 27 arranged to grip the free ends of the expansion arms 22 at the shaped end parts 20. As mentioned above, the left-hand half of FIG. 4 shows the expansion dowel in the insert position with the expansion arms 22 folded inwardly so that they extend approximately parallel with the axis of the shaft part and project forwardly from the leading end of the shaft part. The expansion arms are folded inwardly against the resilient characteristic of the dowel to move into the expanded position. When the ends of the arms are completely folded in along the axis of the dowel, the hook-like elements 27 fit over the shaped ends 20 and lock the dowel in the insert position.

In FIG. 4a the locking action is shown with the hook-like element 27 engaging the shaped end 20 of the expansion arm. The locking action takes place by rotating the link before the expansion arms have moved fully into the folded insert position with the link being turned in the manner shown by the arrow in FIG. 4a. With the link turned slightly the hook-like elements 27 are located in the recessed part 22a in the shaped end 20 of the expansion arm. By releasing the link, when the expansion arms are completely folded into the insert position, the hook-like elements 27 move in the opposite direction to the arrow shown in FIG. 4a with the locking action on the expansion arms becoming effective.

With the expansion dowel of FIG. 4 in the insert position it can be placed through a bore or opening in a structural component. With the expansion dowel fully inserted, the locking action on the expansion arms and support levers can be released in the same manner as described above, that is, by screwing a threaded member into the bore in the link. A screw or bolt is preferable as the threaded member. By means of the threaded member, the link is turned around the axis of the shaft part 1 until the hook-like elements 27 reach the recesses 22a in the shaped end 20 of the expansion arms. When this position of the hook-shaped elements is reached, the expansion arms 22 and support levers 23 are released and the resilient characteristic of the material forming the dowel and the action of the threaded member on the link displaces these members radially outwardly into the expanded position.

The configuration and arrangement of the expansion arms 23, the link 24, the hook-like elements 27, along with the flange 29 and the ribs 30 can be noted from FIGS. 4, 4a, 4b and 4c.

While specific embodiments of the invention have been shown and described in detail to illustrate the application of the invention principles, it will be understood that the invention may be embodied otherwise without departing from such principles.

We claim:

1. Expansion dowel for use in slabs, masonry and similar structural components having a face surface and a hollow space inwardly of the face surface so that the dowel can be inserted through the face surface into the hollow space, said dowel comprising an axially extending shaft part, expansion arms flexibly connected to said shaft so that said arms can be angularly displaced relative to the axis of said shaft, support levers flexibly articulated to said expansion arms, a link interconnecting said support levers at a location spaced from the connection of said levers to said expansion arms, said expansion arms and support levers being angularly displaceable relative to the axis of said shaft part between an insert position with said expansion arms and support levers extending generally parallel to the axis of the shaft part and an expanded position where said expansion arms extend angularly outwardly from said shaft part with said support levers disposed at an acute angle relative to said expansion arms and to the axis of said shaft part, wherein the improvement comprises lock means for releasably securing said expansion arms and support levers in the insert position, said stop means comprise hook-shaped elements formed on said link, and rib-like projections formed on said expansion arms with said hook-like elements engaging said rib-like projections in the insert position of the dowel for securing said expansion arms and support levers in the insert position.

2. Expansion dowel, as set forth in claim 1, wherein said link has one said hook-like element for each said expansion arm with said hook-like elements projecting laterally outwardly from said link and with the hook portions thereof facing toward the location where said expansion arm is connected to said shaft part, each said expansion arm has a connected end secured to said shaft part and a free end spaced from the connected end, and the free end of each said expansion arm being shaped to provide an engagement projection for said hook-like element with said projection element extending transversely across the free end for a length less than the full width of said expansion arm so that the difference forms an opening at said free end through which said hook-like element can extend for locking engagement with said projection element.

* * * * *